United States Patent [19]

Milman

[11] Patent Number: 5,053,781

[45] Date of Patent: Oct. 1, 1991

[54] HIGH RESOLUTION PASSIVE MICROWAVE SENSORS FOR EARTH REMOTE SENSING

[75] Inventor: Andrew Milman, Saline, Mich.

[73] Assignee: Environmental Research Institute of Michigan, Ann Arbor, Mich.

[21] Appl. No.: 194,673

[22] Filed: May 13, 1988

[51] Int. Cl.$^5$ .............................................. G01S 3/02
[52] U.S. Cl. .............................. 342/351; 343/DIG. 2
[58] Field of Search ............... 342/351, 373, 354, 356, 342/191, 188, 25; 343/703, DIG. 2, 705, 708

[56] References Cited

U.S. PATENT DOCUMENTS

| | | |
|---|---|---|
| 3,300,782 | 7/1963 | Margerum et al. |
| 3,714,651 | 1/1973 | Lyon. |
| 3,887,923 | 6/1975 | Hendrix ............................... 343/113 |
| 4,067,009 | 1/1978 | Constant ................................. 343/5 |
| 4,068,234 | 1/1978 | O'Meara ................................ 343/17 |
| 4,090,199 | 5/1978 | Archer .................................. 342/373 |
| 4,276,553 | 6/1981 | Schaefer .............................. 343/112 |
| 4,328,498 | 5/1982 | Yoder ................................... 343/100 |

OTHER PUBLICATIONS

Leo Cardone, "Ultra-Wideband Microwave Beamforming Technique", Apr., 1985, Microwave Journal, pp. 121-131.
D. Archer, "Lens-Fed Multiple Beam Arrays", Sept. 1984, Microwave Journal, pp. 172-195.
B. Mills et al., "A High Resolution Radio Telescope for Use at 3.5 M", Jan. 1968, Proceedings of the IRE, vol. 46, pp. 67-84.
B. Mills, "Cross-Type Radio Telescope", Feb. 1963, Proceedings of the IRE, pp. 132-140.
B. Mills et al., "A High-Resolution Aerial System of a New Type", Australian Journal of Physics, 1953, vol. 6, pp. 272-278.

*Primary Examiner*—Theodore M. Blum
*Attorney, Agent, or Firm*—Krass & Young

[57] ABSTRACT

The present invention is a microwave radiometer for passive microwave remote sensing of the earth's surface. This microwave radiometer is formed as a cross array including a vertical linear array pointed toward nadir and a perpendicular horizontal linear array. A beamformer is coupled to each array for forming a plurality of adjacent fan beams. A plurality of cross correlators produce overlap beams from the overlap of each pair of vertical and horizontal-array fan beams. This arrangement receives microwave energy from the earth at a constant incidence angle, a feature useful in passive microwave sensing. This microwave radiometer provides acceptable radiometric sensitivity and a spatial resolution while requiring less collecting area and thus much less mass than a dish antenna with the equivalent spatial resolution and needing no moving parts. An alternative embodiment of the present invention includes two horizontal arrays and a beamformer simultaneously forming multiple pencil beams each having a constant incidence angle on the earth.

17 Claims, 5 Drawing Sheets

HIGH RESOLUTION PASSIVE MICROWAVE SENSORS FOR EARTH REMOTE SENSING

TECHNICAL FIELD OF THE INVENTION

The present invention relates generally to apparatus for passive microwave remote sensing of the earth from space.

BACKGROUND OF THE INVENTION

Passive microwave remote sensing of the earth's surface provides an opportunity for monitoring the presence of water in many forms. These measurements can be made regardless of cloud cover and in total darkness. Some of the parameters that can be measured on land are soil moisture and soil temperature, the amount of vegetation, snow cover extent and snow water equivalent. In the ocean areas, the sea surface temperature, wind speed, sea ice type and concentration, and hurricane positions can be measured.

Many of these applications require that the instruments have a spatial resolution of 1 to 5 kilometers and operate at frequencies down to 1.4 GHz. For example, in order to measure soil moisture, the frequency has to be low enough for the microwaves to penetrate through the vegetation cover and into the soil.

Most existing imaging microwave radiometers have conventional parabolic dish antennas that scan conically by rotating about the nadir axis. Such conical scanning produces a constant incidence angle at the earth's surface; this is necessary for many remote-sensing tasks. However, it would be impractical to build a scanning dish antenna of this type that is large enough to get 5 kilometer spatial resolution at 1.4 GHz. This would require spinning a 12-meter antenna faster than one revolution per second. It is easy to appreciate the many problems inherent in placing such a structure in orbit. Such a structure would require a system for compensating for the angular momentum of the spinning antenna. This requires a counter-spinning structure that: adds mass to be launched into orbit; consumes energy due to bearing loses; and poses the potential for loss of the satellite if the bearings seize. This type of structure would have to have sufficient structural integrity to withstand the forces developed by such a large, rapidly rotating structure.

Consequently a need exists for a microwave radiometer that can achieve acceptable radiometric sensitivity and spatial resolution without requiring any moving parts.

SUMMARY OF THE INVENTION

The present invention is a cross antenna microwave radiometer (CAMRAD) which consists of two arrays, each made up of multiple adjacent antenna elements. One array is vertical and thus points directly toward nadir. The second array is perpendicular to the first array and therefore horizontal. In accordance with the preferred embodiment, this horizontal array is perpendicular to the velocity vector of the satellite. This represents a convenient choice of orientation and is not required. A beamformer which produces simultaneous multiple fan beams is coupled to each array. A set of cross correlators measures the correlation between every possible pair of fan beams that includes a fan beam from each beamformer. This process serves to produce a pencil beam from each cross correlator located at the position where the respective fan beams overlap. These pencil beams are formed simultaneously, and thus provide coverage over a sufficient area of the earth's surface permitting coverage of the entire surface of the earth within a reasonable period of time. It is contemplated that this CAMRAD will be deployed on a satellite in a polar orbit at a height of approximately 800 kilometers.

This arrangement is advantageous due to the nature of the fan beams formed from the vertical array. Any such fan beam covers a cone of constant angle to the line of the array. Such a conical fan beam from the vertical array intersects the surface of the earth at a constant incidence angle. As noted above, this feature is useful in passive microwave sensing. In this regard, the fan beam covers the earth in a pattern similar to the pattern of a rotating dish antenna. The fan beams of the horizontal array are necessarily perpendicular to the fan beams from the vertical array, insuring that any two such fan beams intersect somewhere on the surface of the earth. Thus the cross correlation between two such fan beams forms a pencil beam similar to that of a dish antenna.

The present invention provides a means for passive microwave remote sensing of the earth from space which meets the needs noted above. The CAMRAD of the present invention: achieves high spatial resolution; requires less collecting area than a dish antenna having a similar spatial resolution; requires very greatly reduced mass; has no moving parts; receives microwave energy emitted from the earth at a constant incidence angle; and achieves acceptable radiometric sensitivity.

The present invention is described with an example having twenty-one antenna elements in each of the arrays. In this example a spatial resolution of 5 kilometers is achieved at a wavelength of 5 centimeters. The CAMRAD in this example would have antenna elements in the horizontal array 0.55 meters wide and 0.55 meters long. The antenna elements of the vertical array would each be 0.55 meters wide and 1.26 meters long. Thus the CAMRAD of this example would have a horizontal array 11.6 meters long and a vertical array 26.5 meters long. This would provide a total collecting area of 20.9 square meters. This collecting area is less than 10% of the collecting area of a dish antenna having an equivalent spatial resolution.

An alternative embodiment of the present invention suitable for mounting on an aircraft includes two horizontal arrays. A beamformer connected to the two arrays simultaneously forms multiple pencil beams. This beamformer includes a summer for each pencil beam; it has a fixed time-delay element for each antenna element of the first and second arrays. The response pattern of the system moves with movement of the aircraft. By providing subdivided antenna elements in one array which points along track, these pencil beams can be formed to have a constant incidence angle.

BRIEF DESCRIPTION OF THE DRAWINGS

These and other objects and aspects of the present invention will become clear from the following description of the invention, in which.

DESCRIPTION OF THE PREFERRED EMBODIMENT

Figure 1:
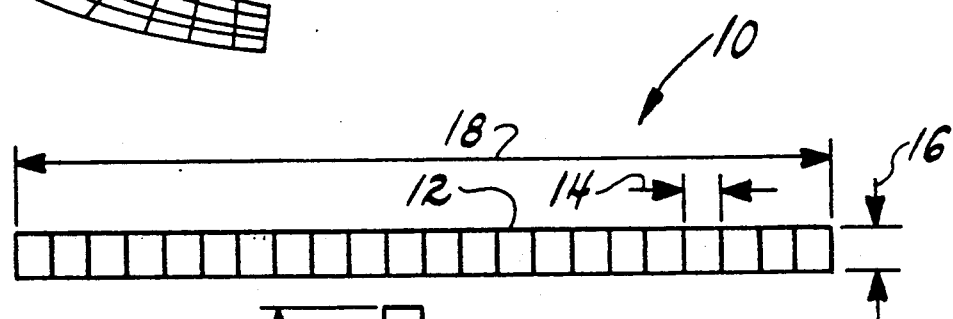
FIG. 1 illustrates construction of the CAMRAD of the present invention with twenty one antenna elements in each array.
Figure 1:
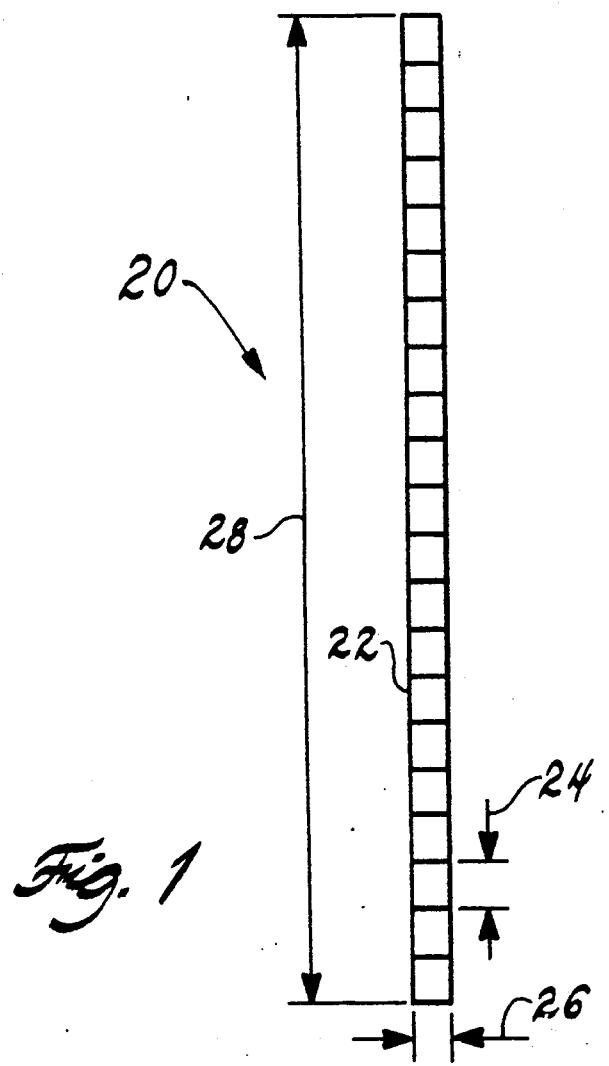

FIG. 1 illustrates an example of the present invention. The cross antenna microwave radiometer (CAMRAD) consists of two linear arrays in a cross or T configuration. The horizontal array 10 is made up of multiple adjacent antenna elements 12, each having a length 14 (measured along the axis of the array) and width 16 (measured across the axis of the array). The horizontal array 10 has an overall length 18. Similarly, the vertical array 20 is made up of multiple adjacent antenna elements 22, each of a length 24 and width 26. The vertical array 20 has an overall length 28. Note that it is important that the two arrays be constructed of adjacent antenna elements forming a contiguous antenna to avoid the formation of grating lobes.

The example illustrated in FIG. 1 shows twenty one antenna elements in each array. This number was selected only for clarity of illustration and more or fewer elements are feasible. In addition, although FIG. 1 illustrates the same number of antenna elements in both horizontal array 10 and vertical array 20, this is not required.

FIG. 1 illustrates the horizontal array 10 and the vertical array 20 disposed in a T configuration. This is not a required configuration but merely a convenient design choice. Other configurations are possible so long as the vertical array 20 is pointed at nadir and horizontal array 10 is located reasonably near to and substantially perpendicular to vertical array 20.

Figure 2:
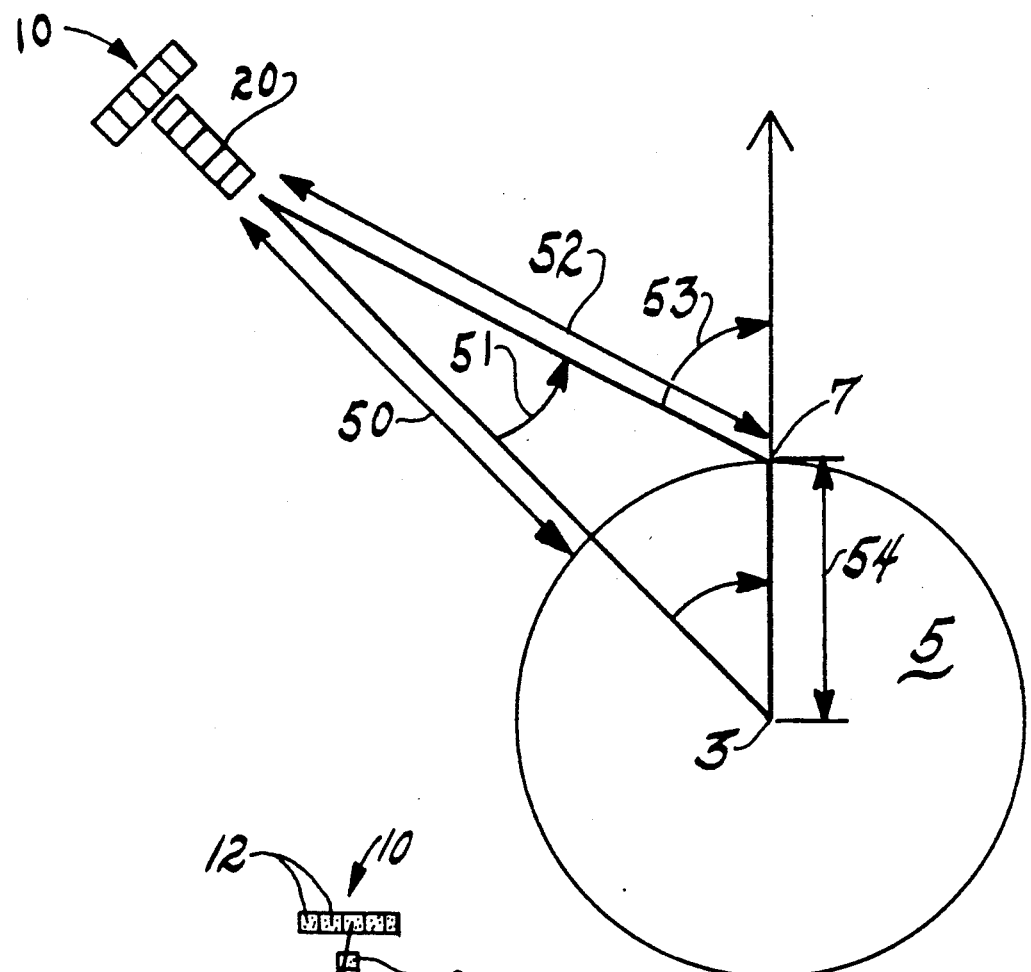
FIG. 2 illustrates the definition of some geometric terms employed in the description of the microwave radiometer of the present invention.

FIG. 2 illustrates the geometry of the CAMRAD in relation to the earth 5. Distance 50 is the height H of the satellite above the earth 5. Distance 52 is the line of sight distance R from the satellite to the point of interest 7 on the surface of earth 5. Distance 54 is the radius $R_e$ of the earth 5. Angle 51 is the angle $\beta$ between the line of sight and nadir. The vertical array 20 points toward nadir. Lastly, angle 53 is the incidence angle $\theta$.

A beamformer that simultaneously develops multiple fan beams is coupled to each array of the present invention. These fan beams are formed as follows. Let $v_j(t)$ be the voltage output received from the j-th antenna element of a total of N elements of one of the arrays. The fan beam is formed by providing a suitable time delay to each voltage $v_j(t)$ and summing over all antenna elements.

$$u_j(t) = \sum_{j=-N/2}^{N/2} v_j(t - \tau_j) \qquad (1)$$

In this formula the center of the array is at $j=0$ and $\tau_j$ is the time delay for the j-th antenna element. For a source at an angle $\xi$ to broadside of a linear array, the difference between the distance to the j-th antenna element and the distance to the center of the array is:

$$\delta_j = j\, d \sin \xi \qquad (2)$$

where d is the distance between adjacent antenna elements. In the general case, this distance d is greater than the length of the antenna elements. The two arrays of this invention, however, are formed of contiguous, adjacent antenna elements, therefore this distance d is the the antenna element length, which is length 14 in the case of horizontal array 10 and length 24 in the case of vertical array 20. Thus the time delay $\tau_j$ is given by:

$$\tau_j = \delta_j/c = (j\, d \sin \xi)/c \qquad (3)$$

where c is the speed of light.

Figure 3:
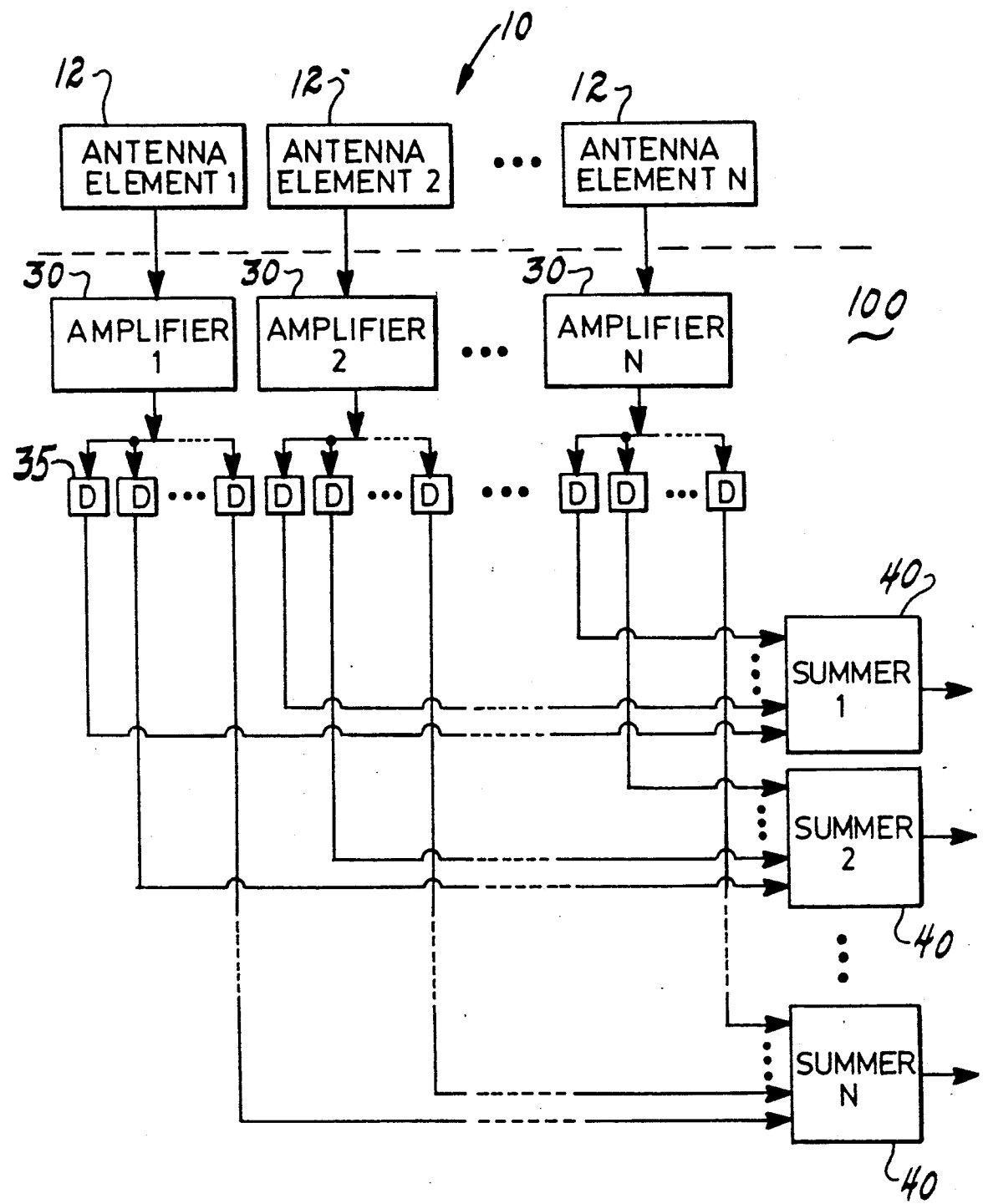
FIG. 3 illustrates in schematic diagram form the beamformer for the horizontal array.

In the present invention, multiple fan beams are formed simultaneously for each of the two arrays. This is achieved using multiple summers, one for each fan beam formed, with corresponding time-delay elements from each antenna element. Beamformer 100 connected to the antenna elements 12 of horizontal array 10 is illustrated in FIG. 3. The voltage output from each antenna element 12 is supplied to an amplifier 30. Each amplifier 30 drives multiple time-delay elements 35. The fan beams are formed in summers 40. Each summer 40 receives the voltage from a corresponding time-delay element 35 for each antenna element. The number of time-delay elements required is equal to the product of the number of antenna elements in the array and the number of fan beams formed. It is considered advantageous to provide a number of fan beams equal to the number of elements of the array. Thus for the CAMRAD example illustrated in FIG. 1, which has 21 horizontal antenna elements 12, there would be 21 fan beams formed. This would require 441 time-delay elements 35. In accordance with the present invention a similar beamformer 200 would be connected to the antenna elements 22 of vertical array 20.

Equation 3 above is employed to calculate the magnitude of the time delays for each time-delay element 35. The magnitude of the time delay $\tau_j$ is computed from the position of the antenna element within the array (j), the separation of the antenna elements d (which in the present invention is equal to the length of the antenna elements) and the angle to broadside of the fan beam $\xi$. In accordance with the present invention the multiple fan beams are formed at a set of predetermined angles to broadside. Thus the magnitude of each time delay is fixed by the design of the beamformer.

The problem of providing the proper time delays will be difficult in a passive microwave remote-sensing apparatus. Many conventional technologies are unsuited for this application because they use phase delays which cannot provide the bandwidth necessary in this application. The bandwidth contemplated for the CAMRAD of the present invention is about 1 GHz. One feasible technique is to convert the microwave signals to visible or infrared light and to use optical beamforming techniques. This technique is taught in "Ultra-Wideband Microwave Beamforming Technique", *Microwave Journal*, Number 28, pages 121 to 131, 1985 by L. Cardone. An alternative technique is to employ Rotman lenses, which are the microwave equivalent of one-dimensional optical lenses. The use of such Rotman lenses in formation of simultaneous multiple beams is taught in "Lens-fed Multiple Beam Arrays", *Microwave Journal*, Number 27, pages 171 to 195, 1984 by D. H. Archer.

Figure 4:
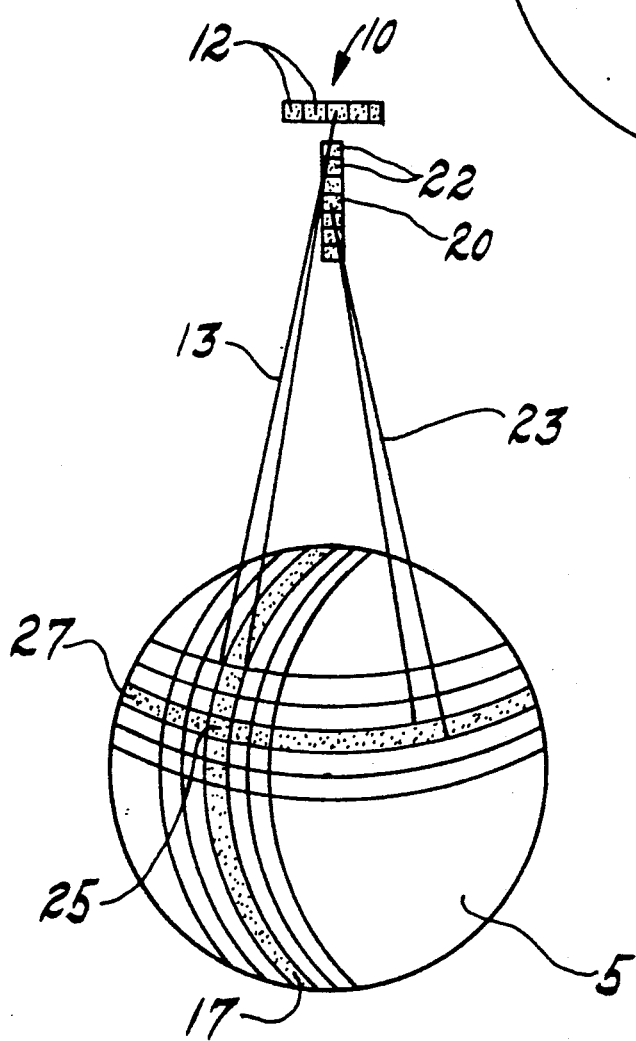
FIG. 4 illustrates the relationship of the CAMRAD of the present invention and its fan beams to the earth.

Referring now to FIG. 4, each fan beam forms part of a cone centered on one antenna array 10 or 20. The fan beam 23 from vertical array 20 traces a path 27 on the earth 5. The vertical array 20 is positioned to point directly at nadir, which causes each part of path 27 to have approximately the same incidence angle at the surface irrespective of azimuth. Any variation in the incidence angle is within the range of the angular width of fan beam 23. For many microwave passive remote-sensing applications, data must be received from a narrow range of incidence angle at the surface of the earth 5. The fan beam 13 from the horizontal array 10 intersects the earth 5 and forms path 17 perpendicular to path 27 on the surface of the earth. By cross correlating the signals from fan beam 23 and fan beam 13, a pencil beam is formed pointing toward the overlap region 25. As illustrated schematically in FIG. 4, the provision of multiple fan beams 13 and multiple fan beams 23 provides a grid of overlap regions 25. Thus the CAMRAD of this invention provides simultaneous coverage of many areas of the earth.

The spatial resolution of the CAMRAD along track $s_x$ and cross track $s_y$ are:

$$s_x = R\lambda/D_x \tag{4}$$

$$s_y = R\lambda/(D_y \cos\theta \sin\beta) \tag{5}$$

where $D_x$ is the length 18 of the horizontal array 10 and $D_y$ is the length 28 of the vertical array 20. It is considered advantageous to configure the CAMRAD of the present invention to provide circular pixels, that is having $s_x = s_y$. This places a limitation on the relative length of the horizontal and vertical arrays. For these spatial resolutions to be equal, then:

$$D_x = D_y \cos\theta \sin\beta \tag{6}$$

In these equations the factor $\cos\theta \sin\beta$ is due to the inclination of the vertical array to the line of sight. The angles $\theta$ and $\beta$ are not independent but are related in a manner dependent upon the orbital height H.

The CAMRAD pattern moves with the orbital motion of satellite. Because it is desirable to provide coverage of the entire earth, it is contemplated that the CAMRAD will be placed in a polar orbit. In the preferred embodiment the orbital height H (distance 50 illustrated in FIG. 2) is approximately 800 kilometers. This provides an orbital period of approximately 104 minutes. The orbital height is selected from a relatively narrow range of heights which provide equator crossings at the same local time for each orbit. Such orbits are called sun synchronous orbits. In addition, this height provides sufficiently reduced atmospheric drag on the satellite for a long orbital lifetime.

Figure 5:
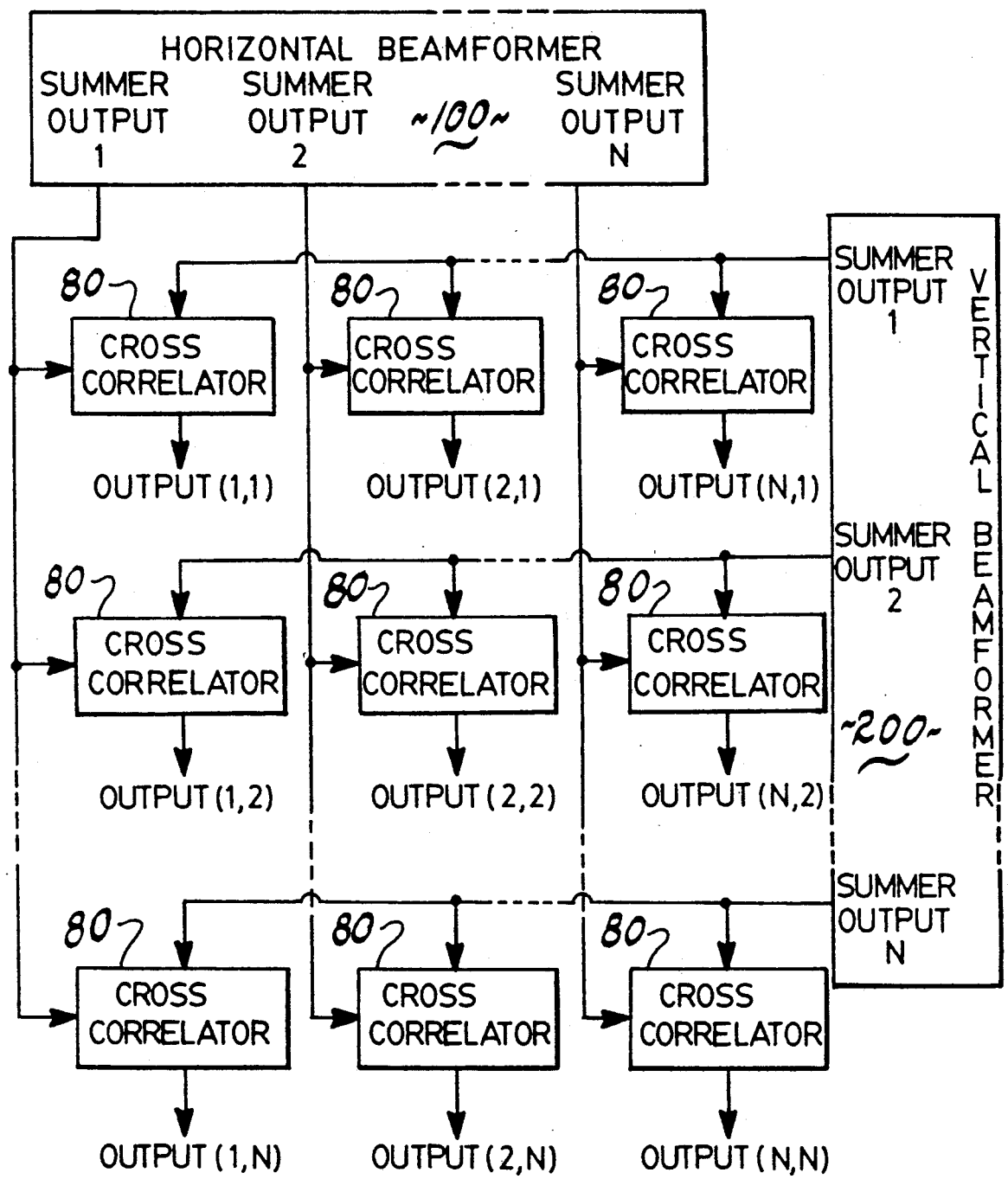
FIG. 5 illustrates in schematic diagram form the cross correlators forming the pencil beams.

FIG. 5 illustrates in schematic diagram form the connection of the cross correlators to the beamformers. Horizontal beamformer 100 (illustrated in FIG. 3) produces multiple summer outputs corresponding to the horizontal-array fan beams. In the same fashion vertical beamformer 200 produces multiple summer outputs corresponding to the vertical-array fan beams. For the example illustrated in FIG. 1, there are 21 horizontal-array antenna elements 12, 21 horizontal-array fan beams, 21 vertical-array antenna elements 22 and 21 vertical-array fan beams.

A number of pencil beams are formed as follows. As shown in FIG. 5, each horizontal summer output is applied to the first input of each cross correlator 80 in a column of such cross correlators. Likewise, each vertical summer output is applied to the second input of each cross correlator 80 in a row of such cross correlators. It should be apparent that the number of cross correlators 80 must be equal to the product of the number of horizontal-array fan beams and the number of vertical-array fan beams. Each cross correlator multiplies the instantaneous voltage from the summer output of the horizontal beamformer with the instantaneous voltage of the summer output of the vertical beamformer and averages this quantity over an integration time $\alpha$. This effectively forms a pencil beam at the intersection of its horizontal-array fan beam and its vertical-array fan beam.

The integration time $\alpha$ employed in the cross correlators 80 must be selected with regard to the orbital speed of the satellite including the CAMRAD. The integration time must be short enough to ensure that each pencil beam is receiving energy from essentially the same part of the earth for the whole of the integration time. This integration time is set equal to $s_y/v$, where $s_y$ is the along track spatial resolution of the pencil beams and v is the orbital velocity of the satellite. This provides the maximum integration time in accordance with the limitation noted above. The output of each cross correlator 80 corresponds to the average received microwave radiation from its corresponding pencil beam and hence from the particular area of the earth where that pencil beam was pointed.

The integration time $\alpha$ is the time a point is within a single pencil beam. The CAMRAD must form an image every $\alpha$ seconds. N fan beams are formed in the along track direction. Thus N images are formed while a point on the surface is within the field of view of one antenna element and within the field of view of one of the pencil beams. Therefore N suitably registered images can be averaged to provide an estimate of the brightness temperature at each point on the earth. The field of view on the ground of one antenna element 12 of the horizontal array 10 is given by:

$$S_y = R\lambda/w \tag{7}$$

where $\lambda$ is the wavelength of the microwave radiation of interest, and w is the length 14 of each horizontal antenna element 12. Thus the total integration time T provided by the CAMRAD is $\alpha N$ or $S_y/v$ because the N fan beams having field of view $s_y$ cover the entire field of view $S_y$.

Table 1 lists the design parameters for the CAMRAD in accordance with an example of the present invention.

TABLE 1

| Parameter | Symbol | Value |
| --- | --- | --- |
| Orbital altitude | H | 800 km |
| Distance to satellite | R | 1160 km |
| Incidence angle | $\theta$ | 50° |
| Maximum allowed element beamwidth | $\Delta\theta$ | 0.1 rad |
| Wavelength | $\lambda$ | 5 cm |
| Spatial resolution | $s_x, s_y$ | 5 km |
| Aperture efficiency | $\eta_a$ | 0.7 |
| Bandwidth | $\Delta\nu$ | 1.0 GHz |
| Ground velocity | v | 7 km/sec |
| System temperature | $T_{sys}$ | 500 K |

These design goals yield a CAMRAD with a horizontal length $D_x$ of 11.6 meters and a vertical length $D_y$ of 26.5 meters. In accordance with the example of the CAMRAD of the present invention having 21 antenna elements in each array, the horizontal antenna elements would be 0.55 meters by 0.55 meters and the vertical antenna elements would be 0.55 meters by 1.26 meters.

With this choice of parameters it is possible to calculate the noise in the measurement of the brightness temperature $\Delta T_N$. This quantity is given by:

$$\Delta T_N = \frac{\sqrt{D_x D_y \sin\beta} \; T_{sys}}{w \, \eta_a \sqrt{T \Delta \nu}} \quad (8)$$

where T is the integration time, the other symbols being defined in Table 1. This integration time is set equal to $S_y/v$ as noted above. This yields a $\Delta T_N$ of about 0.15K. The physical parameters of the CAMRAD of this example are shown in Table 2.

TABLE 2

| Parameter | Value |
|---|---|
| $\Delta T_N$ | 0.15 K |
| $D_x$ | 11.6 m |
| $D_y$ | 26.5 m |
| $d_x = w$ | 0.55 m |
| $d_y$ | 1.26 m |
| N | 21 |

The CAMRAD of this example has a total collecting area of 20.9 m². A dish antenna having the equivalent spatial resolution of 5 kilometer would be 11.6 meters in diameter, and would have 209 square meters of collecting area, ten times the collecting area of the present example. Such a conventional dish antenna would have to scan by rotating about the nadir axis; this would permit an integration time of about 0.7 milliseconds. The radiometric noise of such an antenna would be:

$$\Delta T_N = T_{sys}/\sqrt{\tau \Delta \nu} \quad (9)$$

or about 0.6K. Thus the present example compares favorably with a conventional dish antenna.

Although horizontal array 10 has been described as being perpendicular to vertical array 20, this is not strictly necessary. As long as horizontal array 10 is not parallel to vertical array 20 there will still be an intersection between fan beams 13 and fan beams 23 on the surface of the earth. Therefore the data received will be useful data even for the case that the arrays are not perpendicular. The only uncertainty if the arrays are not perpendicular is in the location of the overlap areas on the earth. If the orbit and attitude of the satellite are is known, then known geological features (such as islands) can be used to determine the direction of the pencil beams. Thus this CAMRAD configuration can still produce useful data even if it is not precisely aligned.

Figure 6:
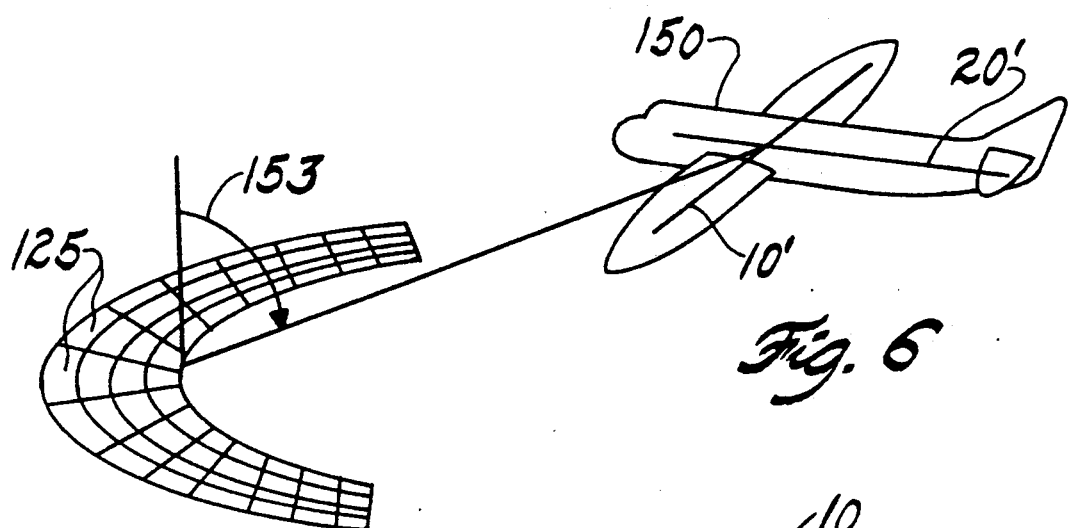
FIG. 6 illustrates an alternative embodiment of the CAMRAD of the present invention.

FIG. 6 illustrates an alternative embodiment of the present invention suitable for mounting on an aircraft. Aircraft 150 includes first horizontal array 10' and second horizontal array 20'. These two arrays are formed of adjacent antenna elements 12' and 22', respectively. A beamformer is connected to the antenna elements 12' and the antenna elements 22' to form the multiple pencil beams simultaneously. These pencil beams receive microwave radiation from multiple spots 125 on the earth. Illustrated in FIG. 6 is a number of such spots 125 forward of aircraft 150.

Figure 7:
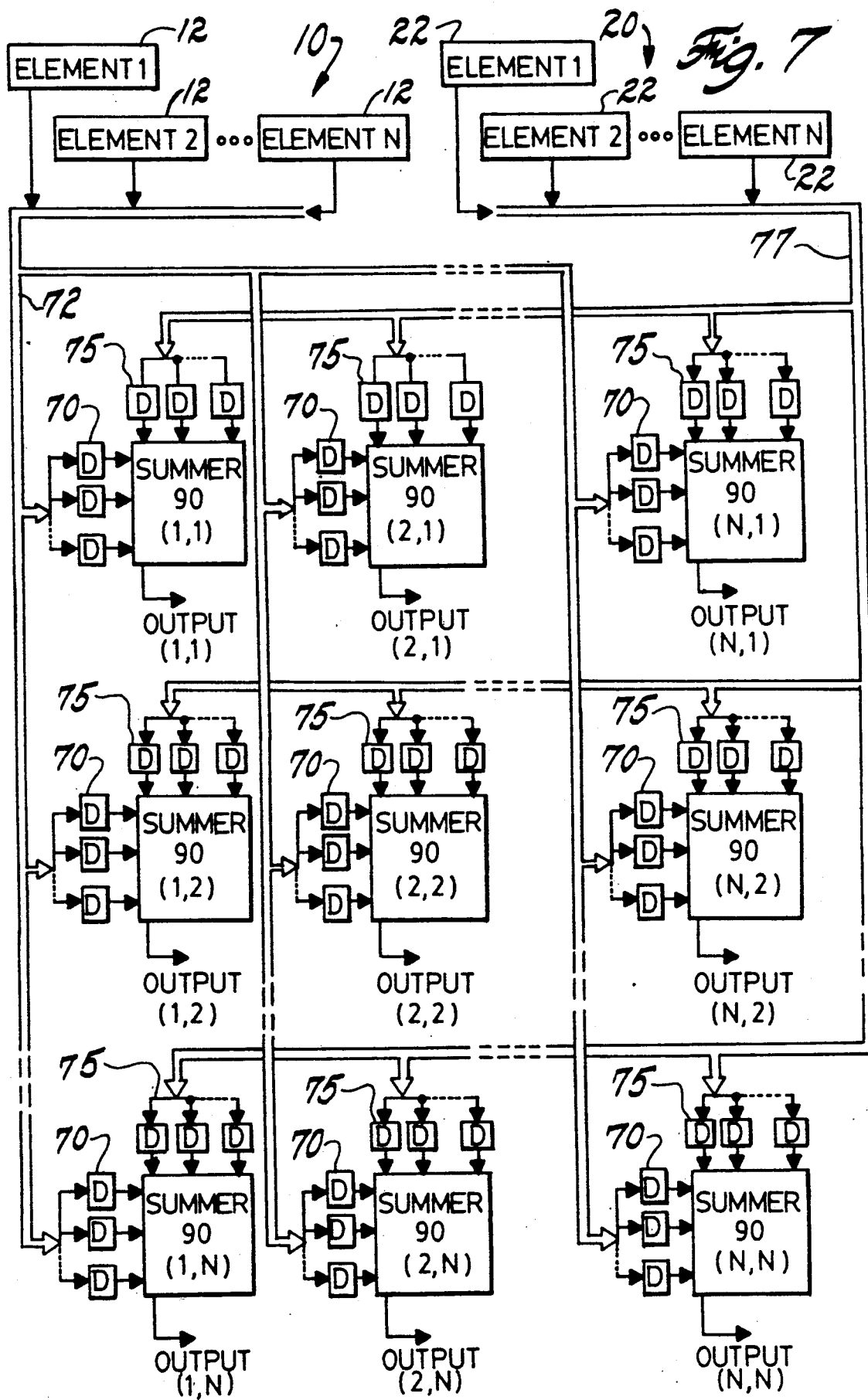
FIG. 7 illustrates in schematic diagram form the beamformer forming the pencil beams in accordance with the alternative embodiment of the present invention.

FIG. 7 illustrates the beamformer employed in this alternative embodiment. The voltage output from the antenna elements 12' are formed into a bus 72. These voltages are applied to a set of corresponding time-delay elements 70 for each summer 90. Each summer 90 includes a time-delay element 70 for each of antenna elements 12'. In a similar fashion, the voltage outputs of antenna elements 22' are formed into a bus 77 and applied individual time-delay elements 75 for the same summer 90. In the case in which first array 10' includes 21 antenna elements 12' and second array 20 includes 21 antenna elements 22', there would be 441 summers 90, each having 21 time-delay elements 70 and 21 time-delay elements 75. The time delays for each time-delay element 70 and time-delay element 75 are computed in a manner similar to that discussed above in conjunction with equations 1 to 3. As in the previously described embodiment, it is contemplated that the time delays of the numerous time-delay elements 70 and 75 will be fixed, forming fixed pencil beams. The response pattern of the system moves with movement of aircraft 150.

Having thus described by invention, it can be seen that numerous alternative configurations can be envisioned without departing from the spirit of this invention.

I therefore claim:

1. An antenna for passive microwave remote sensing of the earth's surface from a satellite comprising:
    a vertical linear array disposed along a line from the satellite toward nadir that includes a plurality of adjacent vertical antenna elements, each vertical antenna element producing first voltage output corresponding to the received microwave energy; and
    a horizontal linear array disposed perpendicular to said vertical linear array that includes a plurality of adjacent horizontal antenna elements, each horizontal antenna element producing a second output corresponding to the received microwave energy.

2. The antenna of claim 1, wherein the number of said plurality of vertical antenna elements equals the number of said plurality of horizontal antenna elements.

3. The antenna of claim 2, wherein said vertical linear array includes twenty-one (21) vertical antenna elements, and said horizontal linear array includes twenty-one (21) horizontal antenna elements.

4. The antenna of claim 1 wherein said horizontal linear array is disposed perpendicular to the velocity vector of the satellite.

5. The antenna of claim 1, wherein the center of said horizontal linear array is attached to an end of said vertical linear array.

6. The antenna of claim 1, wherein the length of said horizontal linear array is related to the length of said vertical linear array by the following formula:

$$D_x = D_y \cos \beta \sin \beta$$

where $D_x$ is the length of said horizontal linear array, $D_y$ is the length of the vertical linear array, $\theta$ is incidence angle to an area of interest on the earth, and $\beta$ is the angle of the line of sight to nadir for the area of interest o the earth.

7. A microwave radiometer for sensing of the earth's surface from a satellite comprising:
    a vertical linear array pointed toward nadir that includes a plurality of adjacent vertical antenna elements, each vertical antenna element producing a first voltage output corresponding to the received microwave energy;

a vertical beamformer coupled to each of said plurality of vertical antenna elements for forming a plurality of adjacent vertical-array fan beams, each vertical-array fan beam being formed of the sum of said first voltages with corresponding fixed time delays;

a horizontal linear array disposed perpendicular to said vertical linear array that includes a plurality of adjacent horizontal antenna elements, each horizontal antenna element producing a second voltage output corresponding to the received microwave energy;

a horizontal beamformer coupled to each of said plurality of horizontal antenna elements for forming a plurality of adjacent horizontal-array fan beams, each horizontal-array fan beam being formed of the sum of said second voltages with corresponding fixed time delays; and a plurality of cross correlators equal in number to the product of the number of said vertical-array fan beams and the number of said horizontal-array fan beams, each cross correlator being connected a unique pair of a corresponding vertical-array fan beam and a corresponding horizontal-array fan beam for forming the time average of the product of said corresponding vertical-array fan beam and said corresponding horizontal-array fan beam, thereby forming an overlap beam from the overlap of said corresponding vertical-array fan beam and said corresponding horizontal-array fan beam.

8. The microwave radiometer of claim 7, wherein the number of said plurality of vertical antenna elements equals the number of said plurality of horizontal antenna elements.

9. The microwave radiometer of claim 7, wherein said horizontal linear array is disposed perpendicular to the velocity vector of the satellite.

10. The microwave radiometer of claim 7, wherein the center of said horizontal linear array is attached to an end of said vertical linear array.

11. The microwave radiometer of claim 7, wherein the length of said horizontal linear array is related to the length of said vertical linear array by the following formula:

$$D_x = D_y \cos \theta \sin \beta$$

where $D_x$ is the length of said horizontal linear array, $D_y$ is the length of the vertical linear array, $\theta$ is incidence angle to an area of interest on the earth, and $\beta$ is the angle of the line of sight to nadir for the area of interest on the earth.

12. The antenna of claim 7, wherein the satellite is disposed in a sun synchronous polar orbit.

13. The microwave radiometer of claim 7, wherein:
the number of said plurality of vertical-array fan beams is equal to the number of said plurality of vertical antenna elements; and
the number of said plurality of horizontal-array fan beams is equal to the number of said plurality of horizontal antenna elements.

14. A microwave radiometer for sensing of the earth's surface disposed on a moving platform comprising:
a first linear array that includes a plurality of adjacent first antenna elements, each first antenna element producing a first voltage output corresponding to the received microwave energy;

a second linear array disposed perpendicular to said first linear array that includes a plurality of adjacent second antenna elements, each second antenna element producing a second voltage output corresponding to the received microwave energy;

a first beamformer coupled to each of said plurality of first antenna elements for forming a plurality of adjacent first-array fan beams, each first-array fan beam formed of the sum of said first voltages with corresponding fixed time delays, a second beamformer coupled to each of said plurality of second antenna elements for forming a plurality of adjacent second-array fan beams, each second-array fan beam formed of the sum of said second voltages with corresponding fixed time delays, and a plurality of cross correlators equal in number to the product of the number of said first-array fan beams and the number of said second-array fan beams, each cross correlator connected to a unique pair of a corresponding first-array fan beam and a corresponding second-array fan beam for forming the time average of the product of said corresponding first-array fan beam and said corresponding second-array fan beam, thereby forming a corresponding pencil beam from the overlap of said corresponding first-array fan beam and said corresponding second-array fan beam, said fixed time delays of said first and second beamformers selected whereby each of said pencil beams has substantially the same incidence angle at the surface of the earth.

15. The microwave radiometer as claimed in claim 14, wherein:
said first linear array is vertical; and
said second linear array is horizontal.

16. The microwave radiometer as claimed in claim 14, wherein:
said first linear array and said second linear array both are horizontal.

17. The microwave radiometer as claimed in claim 14, wherein:
the number of said plurality of first-array fan beams is equal to the number of said first antenna elements; and
the number of said plurality of second-array fan beams is equal to the number of said second antenna elements.

* * * * *

UNITED STATES PATENT AND TRADEMARK OFFICE
CERTIFICATE OF CORRECTION

PATENT NO. : 5,053,781
DATED : October 1, 1991
INVENTOR(S) : Andrew Milman It is certified that error appears in the above-identified patent and that said Letters Patent is hereby corrected as shown below:

Column 8, line 56, "cos $\beta$sin $\beta$" should be --cos $\theta$sin $\beta$--;

Column 8, line 63, "o" should be --on--.

Signed and Sealed this

Ninth Day of March, 1993

*Attest:*

STEPHEN G. KUNIN

*Attesting Officer*     *Acting Commissioner of Patents and Trademarks*